March 28, 1950 J. T. KING 2,502,156
HOSE CLAMP
Filed May 12, 1947 2 Sheets-Sheet 1
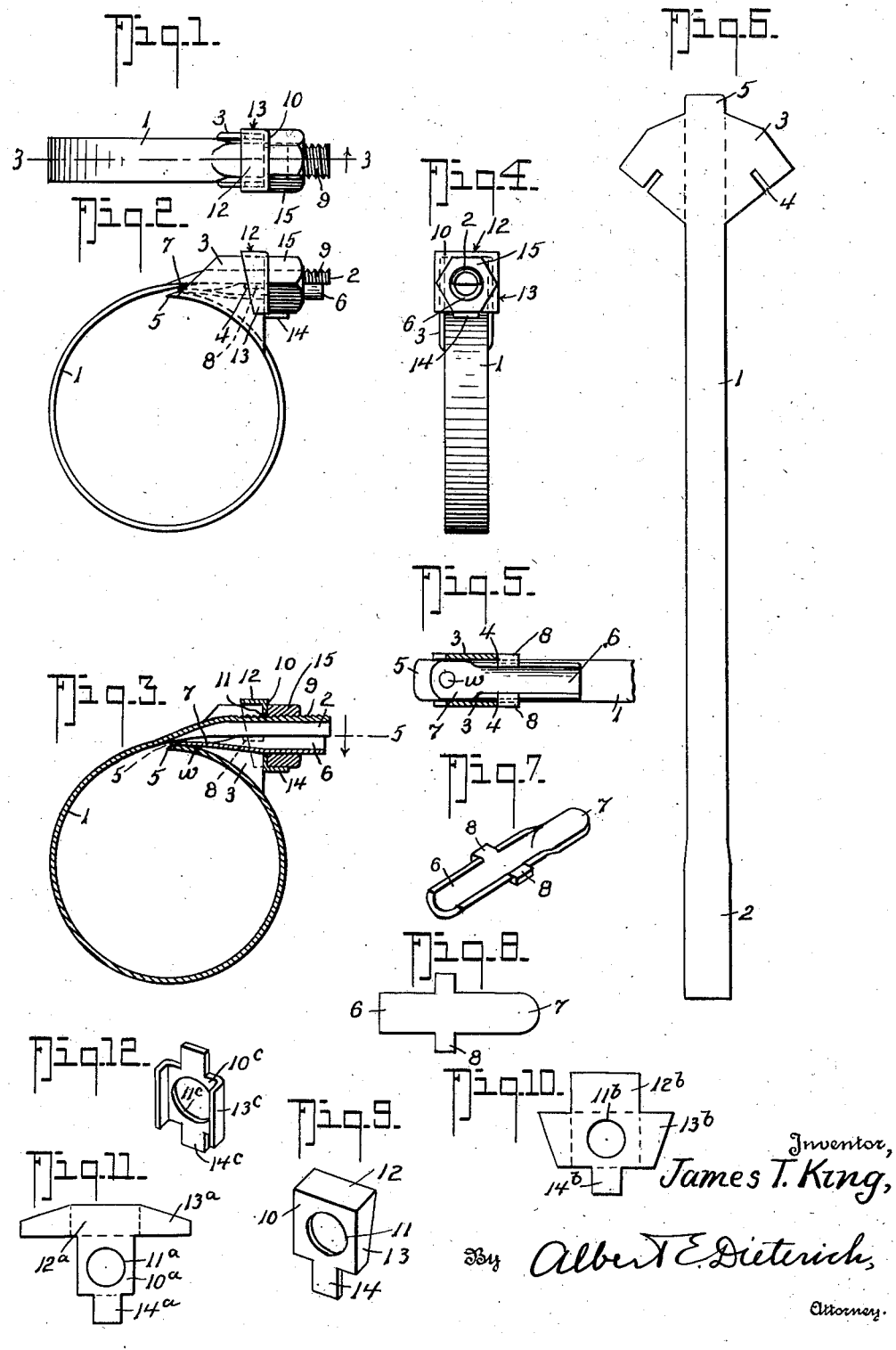

March 28, 1950     J. T. KING     2,502,156
HOSE CLAMP
Filed May 12, 1947     2 Sheets-Sheet 2
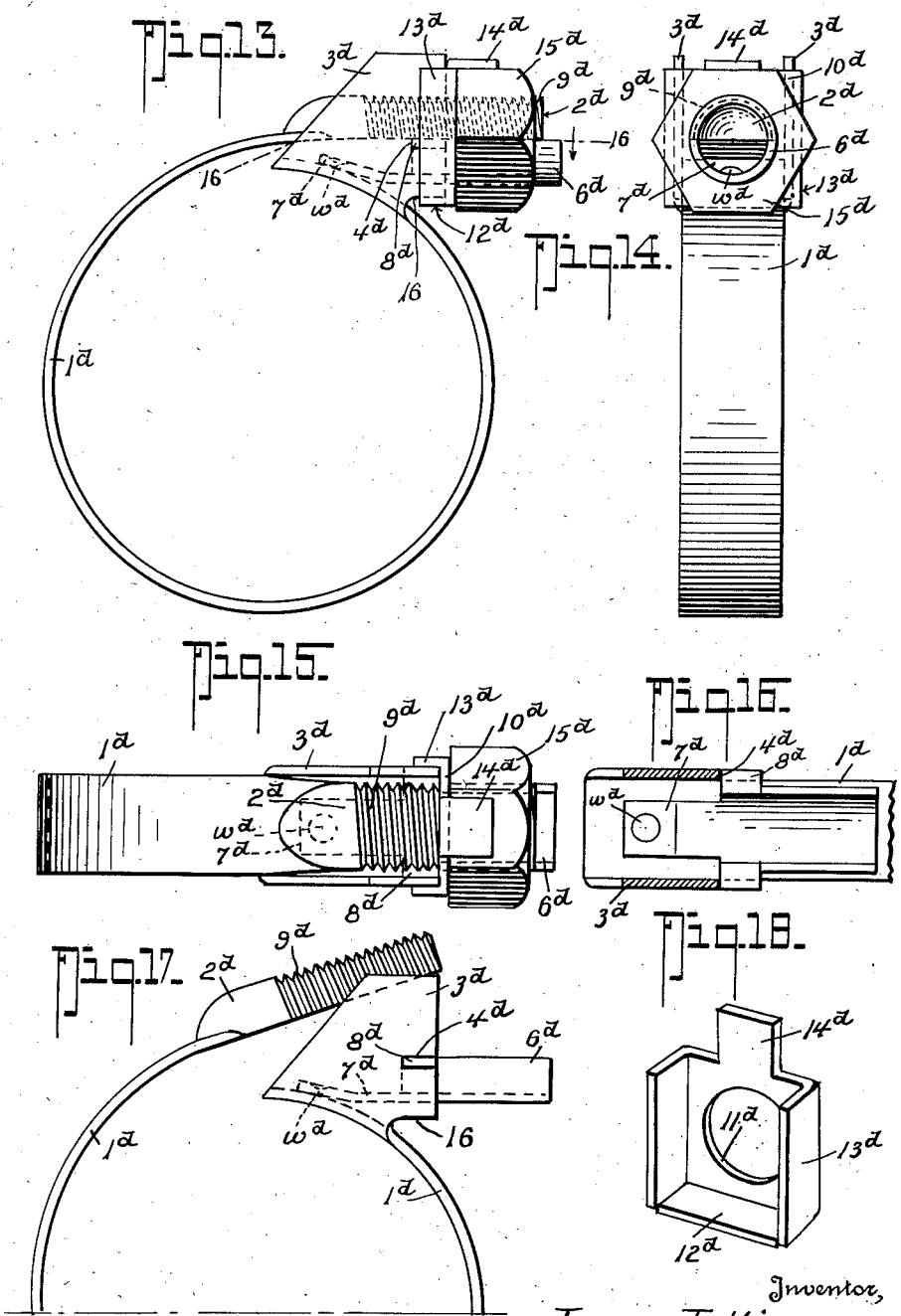
Inventor,
James T. King,
By Albert E Dieterich,
Attorney.

Patented Mar. 28, 1950

2,502,156

UNITED STATES PATENT OFFICE 2,502,156

HOSE CLAMP

James T. King, Burbank, Calif.

Application May 12, 1947, Serial No. 747,376

4 Claims. (Cl. 24—19)

My invention relates to the type of hose clamp disclosed in my Patent No. 2,324,780 issued July 20, 1943 and it has for its objects:

1. To improve the clamp of that patent as well as that disclosed in my application Serial No. 604,389 filed July 11, 1945 now Patent Number 2,462,976 issued March 1, 1949 so as to reduce the cost of manufacture as much as possible and make possible economically to manufacture the clamps in the smaller sizes, i. e., down to clamps of ¾ inch diameters.

2. To enable all parts of the clamp, except the nut, to be formed from sheet metal.

3. To so construct the sheet metal parts as to present maximum strength with minimum gauge metal.

4. To form a clamp with a strap, one end of which is of semi-tubular shape and threaded, while the other end has parallel ears to provide a channel to receive the threaded end for cooperation with a non-threaded complementary semi-tubular body one end of which is anchored between the ears to the strap and whose other end is projected to cooperate with said threaded tubular end and a securing nut.

5. To provide a clamp that when made from material other than steel it is one which is particularly well suited for installation on marine equipment subject to the effects of salt water immersion or exposure. The complete assembly can be fabricated from brass or its alloys.

6. To provide a clamp having a minimum width of strap.

7. To provide a clamp of the foregoing characteristics that is well adapted for use in confined spaces or circular shapes subject to vibration, in particular the bases of radio tubes when the installation is subject to constant effects from vibrations, viz., aircraft and automobile radios.

8. In general to provide a very practical, easy to manufacture and inexpensive general utility hose clamp.

To the attainment of the aforesaid objects and ends invention further resides in the novel features of construction, combinations and arrangements of parts, all of which will hereinafter be first fully described and then be specifically pointed out in the appended claims, reference being had to the accompanying drawings in which:

Fig. 1 is a top plan view of one embodiment of my invention.

Fig. 2 is a side elevation of the same.

Fig. 3 is a section on the line 3—3 of Fig. 1.

Fig. 4 is an elevation looking from right to left in Fig. 2.

Fig. 5 is a detail section on the line 5—5 of Fig. 3.

Fig. 6 is a plan view of the blank from which the principal part of the clamp is formed.

Fig. 7 is a perspective view of that part of the clamp which is, in practice, permanently united to the part shown in Fig. 6 by spot welding and interlocking lugs.

Fig. 8 is a plan view of the blank which when shaped up comprises the part shown in Fig. 7.

Fig. 9 is a perspective view of a combined washer and reinforcing element constituting a part of the approved forms of my invention.

Fig. 10 is a plan view of a washer blank from which a washer of the shape of that shown in Fig. 9 may be formed.

Fig. 11 is a plan view of another washer blank from which a washer of the shape shown in Fig. 9 may be formed.

Fig. 12 is a perspective view of another form of washer that can be used.

Fig. 13 is a view similar to Fig. 2 showing a slight modification of the invention.

Fig. 14 is a view similar to Fig. 4 of the clamp shown in Fig. 13.

Fig. 15 is a view similar to Fig. 1 of the clamp shown in Figs. 13 and 14.

Fig. 16 is a detail section on the line 16—16 of Fig. 13.

Fig. 17 is a detail view hereinafter specifically referred to.

Fig. 18 shows a washer formed from a blank similar to that shown in Fig. 10.

In the drawings in which like numerals and letters of reference indicate like parts in all the figures, 1 represents a sheet metal strap, one end 2 of which is bent into a semi-cylindrical or semi-tubular form, while the other end is formed with right and left ears 3. The ears, when bent up along the dotted lines shown in Fig. 6, lie parallel to each other, thereby providing a longitudinal space or groove in which, when the strap is bent into a loop, the semi-tubular end 2 may lie. The end 2 is shaped and threaded, as at 9, in a suitable die.

A second element, formed from a blank such as is shown in Fig. 8, is shaped by dies to provide a semi-cylindrical or semi-tubular portion 6, a flat end 7 and oppositely laterally extending ears 8. The ears 3 are provided with slots 4 into which the ears 8 are placed with the flat end 7 lying on the strap 1 within the space between the ears 8, where said end 7 is permanently secured to the strap by a spot weld w or in any other suitable way. The semi-tubular member 6 is not threaded and cooperates with the threaded part 2 so that when these two parts are fitted together, they, together, comprise a cylinder or tube to receive a washer 10 and a nut 15 as best shown in Figs. 1 to 4 inclusive.

The washer which I prefer to use has an opening 11 in its face freely to receive the elements 2 and 6. It has sides 13 and a top 12 to embrace the ears 3 and prevent them from being spread apart accidentally. It also has a tongue 14 which may be bent over a flat of the nut 15 to hold the nut from turning (see Figs. 1 to 4 and 9). The washer 10 may be stamped or formed from sheet metal as an integral structure (Fig. 9) or it may be formed by bending blanks such as shown in Figs. 10 and 11 along the dotted lines shown on those figures.

Instead of the washer shown in Fig. 9 a washer like that shown in Fig. 12 may be used.

In Figs. 10, 11 and 12, those parts of the washers which correspond to like parts in Fig. 9 bear the same reference numerals plus the index letter a, b, or c, as the case may be, so a further description thereof is thought to be unnecessary.

In Figs. 1 to 6 inclusive I have shown a lip 5 that is a continuation of the strap and over which the part of the strap entering the space between the ears rides.

In Figs. 13 to 17 inclusive I have shown a slightly modified embodiment of my invention in which the lip is omitted and the non-threaded semi-tubular member is of a slightly different shape as to its part 7$^d$. Further in this embodiment the washer, shown in detail in Fig. 18, is used up-side-down when compared to the washer when used in the first embodiment (Figs. 1 to 7).

In other respects the embodiment of Figs. 13 to 17 and that shown in Figs. 1 to 7 inclusive are substantially the same.

In Figs. 13 to 17 and in Fig. 18 those parts which correspond to like parts in the preceding figures bear the same reference numerals plus the index letter d so a repetition of the description thereof is deemed unnecessary here.

In the second form the ears 3$^d$ of my clamp have undercut portions 16 to receive the flange 12$^d$ of the washer.

The ears 3 in addition to providing a groove or space to receive the threaded end 2, also serve as abutments for washer 10.

The present clamp is much more economical to manufacture than die cast clamps, and the clamps made by the punch press method are of much longer life than when made by the die-cast method such as disclosed in my application aforesaid. One punch press can turn out about 2,000 units per hour as against about 500 units by the die-cast method due to the heat involved to pressure-cast the clamps.

In applying the clamp to the hose to be clamped the strap 1 is wrapped around the hose and its end 2 brought into the space between the ears 3 so as to lie over the member 6. The washer 10 is then placed over the members 2 and 6 which will hold them assembled until the nut 15 can be started on the threads 9.

The nut is drawn up on the members 2 and 6 until the desired tension has been applied to the strap 1 around the hose. As before stated the washer sides will prevent accidental spreading apart of the ears, which might (if spread apart far enough) allow nut 15 to slip inwardly along member 6$^d$ and lessen the tension.

From the foregoing description taken in connection with the accompanying drawings it is thought the construction, uses and advantages of my present invention will be clear to those skilled in the art.

What I claim is:

1. A hose clamp composed of a strap of sheet metal one end of which is curved to constitute a semi-cylindrical member, said member being externally threaded, the other end of said strap having parallel ears extended at right angles to the plane of the strap at the sides thereof to provide a passage into which the threaded end of the strap may be placed while the clamp is in use, a second sheet metal body separate from said strap, one end of which body is curved to constitute a semi-cylindrical member to cooperate with said threaded member, means for securing said second body to said strap between the ears of the same, said second body abutting said threaded semi-cylindrical member to form a cylinder therewith, said ears serving as abutments, and a nut on said semi-cylindrical members bearing against said abutments for applying tension to said strap, said ears having slots and said second body having ears held in said slots.

2. A clamp according to claim 1 wherein a washer is provided, said washer having a hole in its face to fit over said semi-cylindrical member and engage said ears and having side flanges to overlap the sides of said ears and having a third flange to engage either the upper edge or lower edges of the ears accordingly as the washer is placed with said third flange in one position or another, said washer having a tongue to be bent over the flat of said nut.

3. A hose clamp composed of a strap of sheet metal one end of which is curved to constitute a semi-cylindrical member, said member being externally threaded, the other end of said strap having integrally formed parallel ears extended at right angles to the plane of the strap at the sides thereof to provide a passage into which the threaded end of the strap may be placed while the clamp is in use, said ears having undercut portions, a second sheet metal body one end of which is curved to constitute a semicylindrical member to cooperate with said threaded member, means fixedly securing said second body to said strap to lie in part between the ears of the same and abutting said threaded semi-cylindrical member to form a cylinder therewith, said ears serving as abutments, a washer on said semicylindrical members and abutting said ears, and a nut on said semicylindrical members and abutting said washer for applying tension to said strap, said washer having a pair of ear-engaging flanges and nut-flat-engaging tongue, said washer having a third flange to engage either the upper edge or the undercut portion of said ears accordingly as said washer is placed with said third flange in one position or another, said ears having slots and said second sheet metal body having ears to enter said slots to hold said second body against rising between the first mentioned ears.

4. A hose clamp composed of a strap of sheet metal one end of which is curved to constitute a semi-cylindrical member, said member being externally threaded, the other end of said strap having parallel ears extended at right angles to the plane of the strap at the sides thereof to provide a passage into which the threaded end of the strap may be placed while the clamp is in use, a second sheet metal body separate from said strap, one end of which body is curved to constitute a semi-cylindrical member to cooperate with said threaded member, means for securing said second body to said strap between the ears of the same, said second body abutting said threaded semi-cylindrical member to form a cylinder therewith, said ears serving as abutments, and a nut on said semi-cylindrical members bearing against said abutments for applying tension to said strap, said ears having slots and said second body having ears held in said slots, said slots entering from the edge of each abutment that faces the nut.

JAMES T. KING.

REFERENCES CITED

The following references are of record in the file of this patent:

UNITED STATES PATENTS

| Number | Name | Date |
|---|---|---|
| 660,245 | Bunte et al. | Oct. 23, 1900 |
| 1,219,273 | Elkin | Mar. 13, 1917 |
| 1,252,637 | Westcott | Jan. 8, 1918 |
| 1,691,288 | Holyfield | Nov. 13, 1928 |
| 1,804,358 | Lyons et al. | May 5, 1931 |
| 2,290,960 | Hallerberg | July 28, 1942 |
| 2,324,780 | King | July 20, 1943 |
| 2,346,906 | Cheney | Apr. 18, 1944 |
| 2,462,976 | King | Mar. 1, 1949 |

FOREIGN PATENTS

| Number | Country | Date |
|---|---|---|
| 195,197 | Canada | Dec. 23, 1919 |